US010257471B2

(12) United States Patent
Riezler

(10) Patent No.: US 10,257,471 B2
(45) Date of Patent: Apr. 9, 2019

(54) STEERABLE NOZZLE-MOUNTED CAMERA SYSTEM AND METHOD

(71) Applicant: ENVIROSIGHT LLC, Randolph, NJ (US)

(72) Inventor: Josef Riezler, Waltenhofen (DE)

(73) Assignee: ENVIROSIGHT LLC, Randolph, NJ (US)

( * ) Notice: Subject to any disclaimer, the term of this patent is extended or adjusted under 35 U.S.C. 154(b) by 132 days.

(21) Appl. No.: 15/008,272

(22) Filed: Jan. 27, 2016

(65) Prior Publication Data

US 2016/0219205 A1 Jul. 28, 2016

Related U.S. Application Data

(60) Provisional application No. 62/107,094, filed on Jan. 23, 2015.

(51) Int. Cl.
*H04N 7/18* (2006.01)
*G01M 3/00* (2006.01)
*G03B 37/00* (2006.01)
*H04N 5/225* (2006.01)

(52) U.S. Cl.
CPC ............. *H04N 7/183* (2013.01); *G01M 3/00* (2013.01); *G01M 3/005* (2013.01); *G03B 37/005* (2013.01); *H04N 5/2252* (2013.01); *H04N 7/185* (2013.01); *H04N 2005/2255* (2013.01)

(58) Field of Classification Search
CPC ............. H04N 7/183; H04N 7/185; H04N 2005/2255; H04N 5/2252; G01M 3/00; G03B 37/005
USPC .......................................................... 348/84
See application file for complete search history.

(56) References Cited

U.S. PATENT DOCUMENTS

| 6,138,697 A * | 10/2000 | Horger ................. B08B 9/0495 134/167 C |
| 2005/0051626 A1 | 3/2005 | Hsiao |
| 2011/0048559 A1 | 3/2011 | Stutchbury |
| 2013/0125929 A1 * | 5/2013 | Inada ................... G21C 17/017 134/22.12 |
| 2014/0073238 A1 * | 3/2014 | Henn .................... G06T 1/0007 455/7 |

* cited by examiner

Primary Examiner — Allen C Wong
(74) Attorney, Agent, or Firm — FisherBroyles LLP

(57) ABSTRACT

A system for imaging a pipe comprising: (a) a first nozzle having a plurality of jets configured such that expelling fluid from the first nozzle urges the nozzle in an axial direction without substantially biasing the first nozzle laterally; (b) a second nozzle in fluid communication with the first nozzle, the second nozzle having one or more jets configured such that expelling fluid from the second nozzle biases the second nozzle laterally, wherein at least one of the first or second nozzles is configured for attachment to a hose for providing pressurized fluid, wherein the second nozzle is operatively connectable to the hose such that rotating the hose rotates the second nozzle; and (c) a camera attached proximately to the second nozzle.

20 Claims, 2 Drawing Sheets

STEERABLE NOZZLE-MOUNTED CAMERA SYSTEM AND METHOD

REFERENCE TO RELATED APPLICATION

This application claims priority to U.S. Provisional Application 62/107,094 filed on Jan. 23, 2015, incorporated herein by reference.

FIELD OF INVENTION

The present invention relates to a camera system for imaging the inside of pipes, and, more specifically, to a nozzle-mounted camera for lateral inspection and navigation through pipes.

BACKGROUND

Most municipalities contain a vast network of storm and sewer pipes, often representing the oldest infrastructure in the community. Periodically, these pipes must be inspected for problems such as cracks, blockage, build-up, and root infiltration. To this end, it is common for a device such as a pipe crawler or push camera to be introduced into the pipe to perform the inspection. Although effective in obtaining detailed images, using a pipe crawler is inconvenient and requires a great deal of time to set up and operate even if no problem is discovered. Furthermore, the use of pipe crawlers is frequently limited by the size and configuration of pipes to be entered. In this regard, often the condition of the pipe (e.g., debris and fractures) prevents the use of inspection devices like crawlers.

The inefficiencies associated with routine inspections are exacerbated in situations where the pipes need to be cleaned since pipe inspection and cleaning are typically performed by different personnel, often at different times. There is a need for a more convenient approach to inspect and maintain underground pipes without the time and complexity associated with specialized inspection techniques inherent in the use of pipe crawlers or push cameras. This need is fulfilled using nozzle mounted cameras as disclosed in U.S. Patent Application Publication No. US-2014-0247338, herein incorporated by reference. Although the nozzle mounted camera provides a convenient and efficient means to inspect pipes, Applicants have identified yet another need for a nozzle-mounted camera to be steerable to navigate turns, laterals and debris in pipes. The present invention fulfils this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a means of steering a nozzle-mounted camera through obstacles and turns in pipes by using a combination of two nozzles in which one provides the force to move the camera forward along the pipe, and another, near the camera head which steers the assembly. Thus, the system uses high-pressure fluid (e.g., water) for propulsion, steering and cleaning as it captures live inspection video from inside lateral lines. The system is able to traverse multiple bends in pipe, steer through branches, and levitate above debris. With these special capabilities, users are able to locate failed pipes, cross-bores and blockages, as well as perform cleaning.

One aspect of the invention is a steerable, nozzle-mounted inspection and cleaning system. In one embodiment, the system comprises: A system for imaging a pipe, the system comprising: (a) a first nozzle having a plurality of jets configured such that expelling fluid from the first nozzle urges the nozzle in an axial direction without substantially biasing the first nozzle laterally; (b) a second nozzle in fluid communication with the first nozzle, the second nozzle having one or more jets configured such that expelling fluid from the second nozzle biases the second nozzle laterally, wherein at least one of the first or second nozzles is configured for attachment to a hose for providing pressurized fluid, wherein the second nozzle is operatively connectable to the hose such that rotating the hose rotates the second nozzle; and (c) a camera attached proximately to the second nozzle.

In another embodiment, the system comprises: (a) a first hose for conveying pressurized fluid, such as water, the first hose having a distal end; (b) a first nozzle attached to the distal end, the first nozzle configured with a plurality of jets symmetrically arranged around the first nozzle such that expelling fluid from the first nozzle urges the nozzle in an axial direction opposite of the distal end without substantially biasing the first nozzle laterally; (c) a second hose attached to the first nozzle at a first end; (d) a second nozzle attached to a second end of the second hose, the second nozzle configured with one or more jets asymmetrically arranged around the second nozzle such that expelling fluid from the second nozzle biases the second nozzle laterally, thereby allowing the system to be steered as it is propelled along a pipe by rotating the first hose; and (e) a camera attached proximately to the second nozzle.

Another aspect of the invention is a method of using the system to inspect pipes and other structures having bends, laterals and debris. In one embodiment, the method comprises: (a) inserting the camera in the pipe; (b) pressurizing the hose such that fluid is expelled from the first nozzle to propel the camera axially along the pipe; (c) identifying a lateral, a bend or debris in the pipe; (d) rotating the hose to rotate the second nozzle, thereby laterally biasing the second nozzle toward the lateral, into the bend or around the debris; and (e) imaging at least a portion of the interior of the pipe.

DETAILED DESCRIPTION

Figure 1:
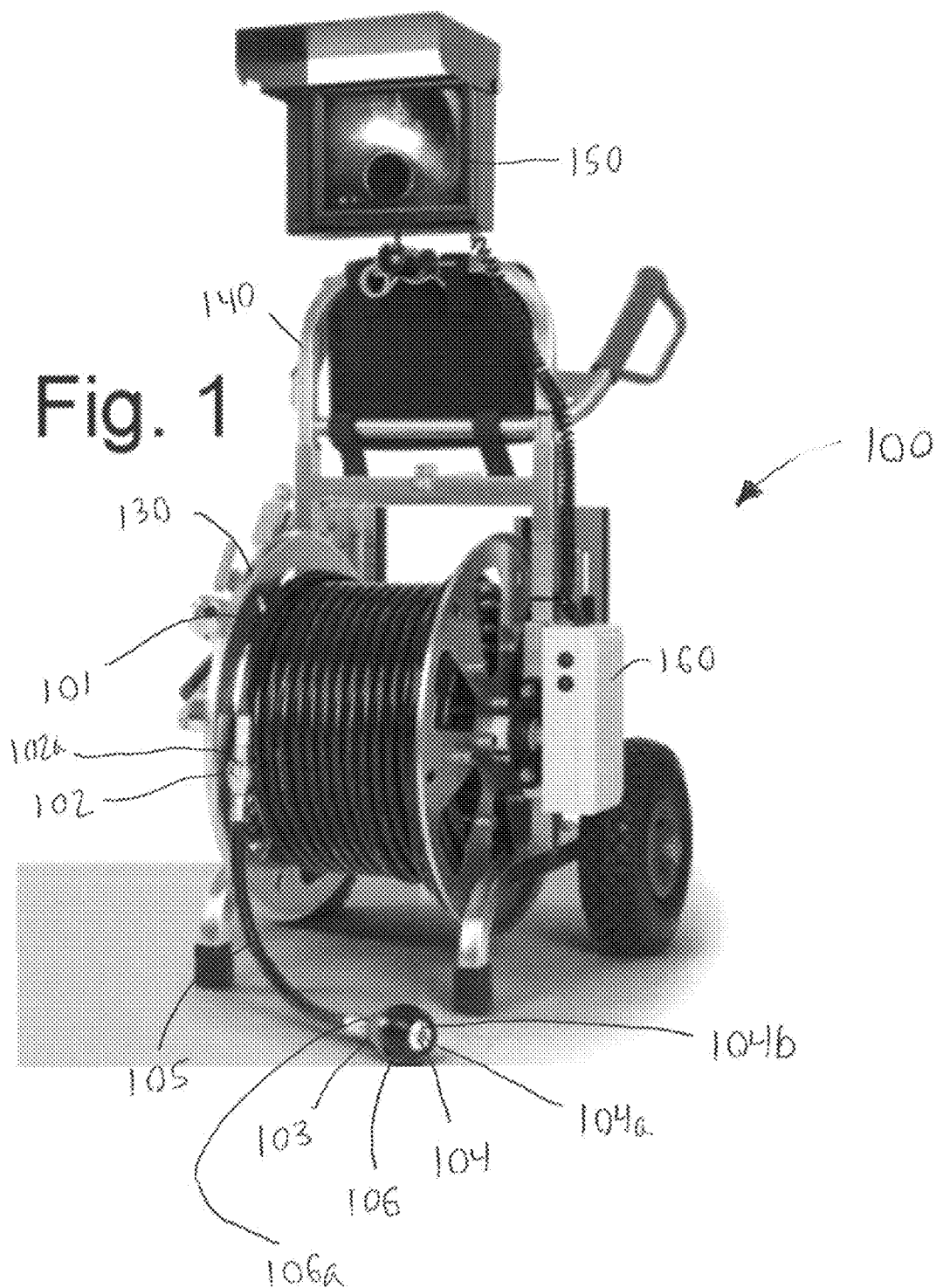
FIG. 1 shows one embodiment of the nozzle-mounted camera system of the present invention.
Figure 2:
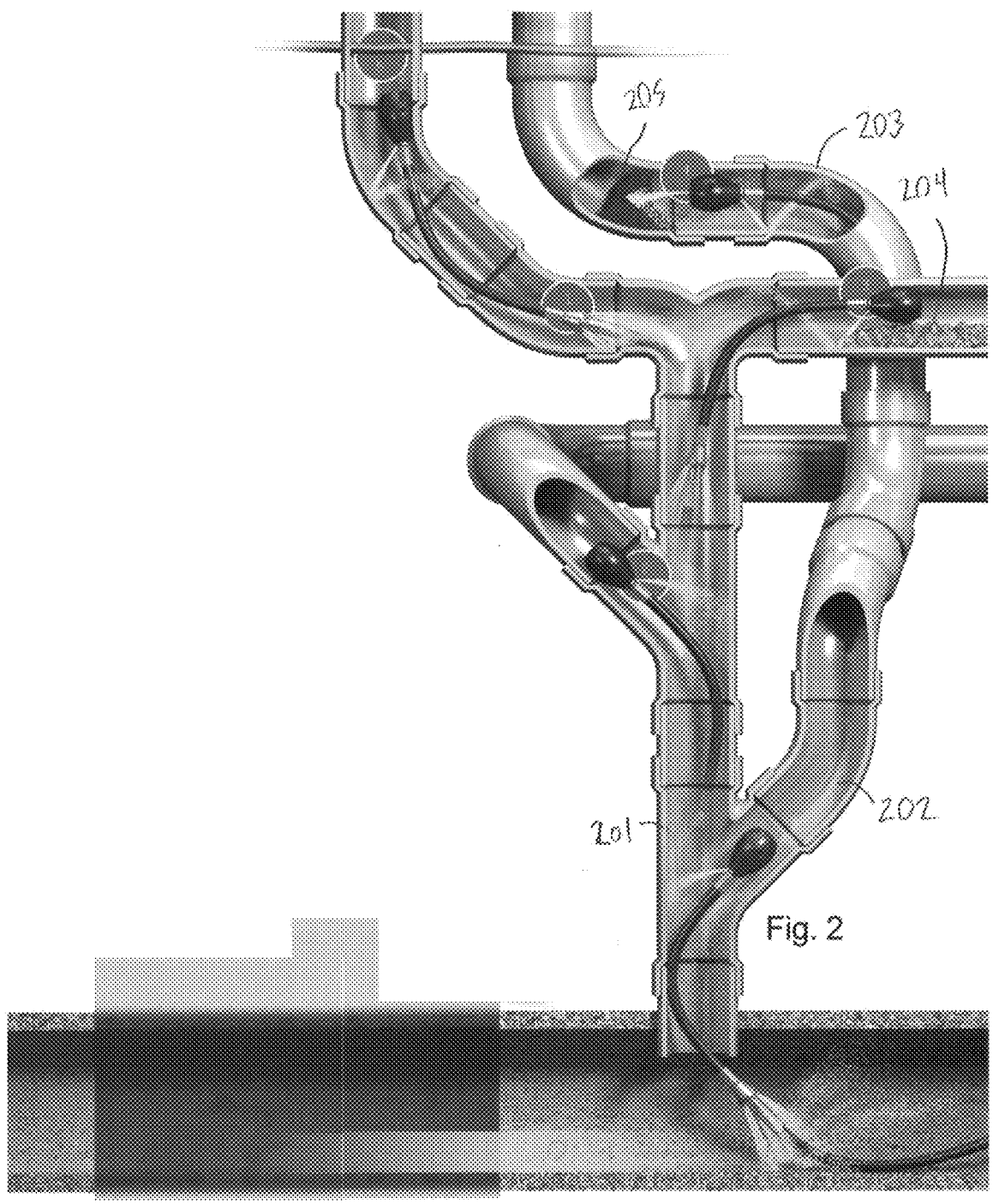
FIG. 2 illustrates the various uses of the system of the present invention.

Referring to FIGS. 1 and 2, a preferred embodiment of a nozzle-mounted camera system 100 is shown. The system 100 comprises: (a) a first nozzle 102 having a plurality of jets 102*a* configured such that expelling fluid from the first nozzle urges the nozzle in an axial direction without substantially biasing the first nozzle laterally; (b) a second nozzle 103 in fluid communication with the first nozzle, the second nozzle having one or more jets 103*a* configured such that expelling fluid from the second nozzle biases the second nozzle laterally, wherein at least one of the first or second nozzles is configured for attachment to a hose 101 for providing pressurize fluid, wherein the second nozzle is operatively connectable to the hose such that rotating the hose rotates the second nozzle; and (c) a camera 104 attached proximately to the second nozzle.

Referring to FIG. 2, one embodiment of a method for imaging a pipe having one or more bends 203 or laterals 202 using the inspection system 100 is illustrated. The method comprises (a) inserting the camera 104 in the pipe 201; (b) pressurizing the hose 101 with fluid such that fluid is expelled from the first nozzle 102 to propel the camera 104 axially along the pipe 201; (c) identifying a lateral 202 of or bend 203 in the pipe; (d) rotating the hose 101 to rotate the second nozzle 103, thereby laterally biasing the second nozzle toward the lateral 202 or bend 203; and (e) imaging at least a portion of the interior of the pipe.

Each of these elements/steps is considered below in detail with respect to selected embodiments.

The first nozzle 102 functions to provide axial force to the system to propel the system along a pipe. Such nozzles are known, and, accordingly, are not described in detail herein. Generally, such nozzles comprise a number of jets configured to expel fluid to force the nozzle in a certain direction. In one embodiment, the jets are aimed rearward such that pressurized fluid expelled from the jets forces the nozzle forward. In one embodiment, a number of jets, for example six, are arranged symmetrically around the perimeter of the nozzle and pointed rearward. Still other embodiments will be understood by those of skill in the art in light of this disclosure.

Although conventional nozzles may be used to practice the present invention, it should be understood that applicant anticipates nozzles being optimized for carrying camera systems. For example, such nozzles may be optimized to minimize lateral spray which may interfere with the imaging process. In this respect, the jets can be configured to direct the spray of water axially and thus propel the nozzle more efficiently. Still other enhancements and optimizations of the nozzle will be obvious to those of skill in the art in light of this disclosure.

The second nozzle functions to provide a lateral force to the second nozzle to facilitate steering the system. Thus, in contrast to the first nozzle, which moves axially, the second nozzle moves laterally. It should be understood that, by rotating the nozzle the direction of the lateral movement will rotate as well. Thus, by rotating the hose upon which the second nozzle is connected, direction of lateral movement of the second nozzle changed, thereby enabling the camera to be steered.

The second nozzle comprises one or more jets that are configured to provide the lateral biasing described above. The configuration of such jets will be known to one of skill in the art in light of this disclosure. Generally, the jets are arranged asymmetrically around the perimeter of the nozzle such that, when expelling fluid, the nozzle is biased in a direction opposite of that of the expelling fluid. In one embodiment, there is just one jet, although those of skill in the art will appreciate that other configurations of two or more jets are possible to provide the biasing force described above.

In another embodiment, a third nozzle is provided proximate to the camera to expel pressurized fluid forward of the camera to clean the interior of the pipe or other structure being inspected. Again, the configuration of such nozzles is well known in the art and will not be described in detail herein. Suffice it to say that the third nozzle should be configured to provide a strong stream of fluid to clear obstructions and generally clean the pipe. In one embodiment, the third nozzle is remotely controlled such that it may be turned on and off remotely. Such an embodiment allows the camera to view the pipe or other structure being inspected without being obstructed by the spray from the third nozzle. Likewise, it should be understood that in one embodiment, the first and second nozzles are also independently controlled enabling them to start and stop remotely.

The configuration of the first, second and third nozzles can vary according to the application. For example, in one embodiment, the nozzles are integral, and, in another embodiment, they are discrete. Generally, although not necessarily, the second nozzle will be forward of the first nozzle and thus provide its steering function ahead of the forward thrust function provided by the first nozzle. Accordingly, in one embodiment, the first nozzle is disposed between the hose and the second nozzle.

To enhance the steering ability of the second nozzle, in one embodiment, it is separated from the first nozzle by a flexible hose or member. The separation distance between the first and second nozzles can vary according to the application. Generally, a separation of six inches to three feet has been found to be effective. The optimum length can be determined by one of skill in the art in light of this disclosure. For example, if the length gets too long, then the second nozzle may be able to move in an uncontrolled fashion, even to the point of turning 180 degrees and heading back toward the first nozzle. On the other hand, if the distance between the first and second nozzles is too short, the ability of the second nozzle to move axially may be impaired. Additionally, the proximity of the spray from the first nozzle may diminish the quality of the video recording.

At least one of the nozzles is configured for attachment to a hose—e.g., any commercially-available hose coupling or similar device. If the first nozzle is disposed between the hose and the second nozzle, the first nozzle may have hose connections on its front and back ends for connection to the second nozzle and hose, respectively. In this embodiment, fluid would pass through the first nozzle to the second nozzle. Alternatively, the second nozzle may have a dedicated hose to supply pressurized fluid.

The camera may be any commercial camera suitable for sewer inspection. Generally, the camera comprises a housing, which serves to protect the internal components of the camera, which may include, for example, the imaging device, power supply, lamps, and memory device. Because the camera will be used in sewers and storm drains which may be partially or fully filled with water or other liquid, and because the propulsion system of the nozzle is usually water, it is generally preferred, although not necessary, that the housing be waterproof to protect the internal components.

In one embodiment, in addition to being waterproof, the housing is also configured to be pressurized. Pressurizing the housing ensures that liquid and other debris does not enter the housing and compromise the internal components. The housing can be pressurized with any conveniently-obtained, non-flammable gas such as, for example, air or nitrogen. Generally, nitrogen is preferred.

The housing also provides a transparent window 104a through which the imaging device records images of the interior of the pipe as the nozzle travels down the pipe. In one embodiment, the camera also comprises at least one lamp 104b to illuminate the field of view of the imaging device. Suitable lamps include, for example, LED, halogen and high intensity discharge lamps. Such lamps are well known and commercially available. Generally, LED lamps are preferred because of their low power consumption.

The camera also comprises an imaging device within the housing. The imaging device may be any known, commercially-available imaging device. In one embodiment, the camera has a wide field of view. In one particular embodiment, the viewing angle is about 145 degrees diagonal, with a VGA resolution of about 640×480 pixels. In one embodiment, the imaging device is configured to transmit live video and in another embodiment is configured to record in AVI-files format. It should be understood, however, that imaging device with varying viewing angles, resolutions and recording formats can be practiced with the invention. For example, the images recorded may be video images or still images or a combination of the two.

In one embodiment, the camera system is powered by batteries contained within its housing. Such an approach is advantageous in that such batteries are well known and commercially available and allow the camera to be a totally self-sufficient image recording unit. It should also be noted that the battery in this context is used broadly to refer to any traditional battery or fuel cell power approach. Alternatively, in one embodiment, power is provided remotely and is connected to the camera through a conventional power cord or through the hose.

In another embodiment, the camera is provided with locating transmitter such as those provided by Sonde for tracking the location of the camera in the pipe.

The camera may be connected to the second nozzle in different ways. For example, in one embodiment, the second nozzle and the camera are integrated into a common housing. In another embodiment, the camera is discrete from the second housing. Regardless however, generally speaking, it is preferable to have the camera in close proximity to the second nozzle as the second nozzle provides the ability to steer or aim the camera.

In one embodiment, the system further comprises a bulbous housing around the camera. The purpose of the bulbous housing is to occupy space such that, when the system is being propelled down a pipe, the camera is not riding around the wall, but rather is offset from the wall a certain distance by the bulbous housing. This expands the field of view of the camera as well as distances the camera from debris that may be found along the pipe wall. In one embodiment, the system comprises interchangeable bulbous housings of different sizes, which can be readily installed on the camera depending upon the diameter and the level of debris in the pipe or the structure being inspected.

The hose functions to deliver the pressurized fluid to the nozzles. The hose may be any commercially-available hose used in the pipe cleaning industry. Those of skill in the art will be able to size the hose based on the applications requirements. Generally, although not necessarily, the hose should be configured to handle fluid flow and pressures of 10-20 gpm and 1000-2000 psi. Likewise, the system should be coupled with a pump cable of providing the flow and pressure values. It is generally preferred to pressurize the hose with water and expel the water through the jets to propel the nozzle down the pipe, other embodiments are possible. For example, rather than water, the hose can be pressurized with air such that air propels the nozzle down the pipe.

In one embodiment, the hose also functions to provide power and control communications to the camera and possibly to one or more of the nozzles (if they are remote controlled), particularly the third nozzle as described above. Alternatively, rather than powering the camera and providing control to the camera, the camera may be wirelessly controlled and may contain batteries as described above.

Referring to FIG. 1, one embodiment of the system is shown. In addition to the components described above, the system 100 comprises a frame 140 upon which the various components are attached. In one embodiment, the frame comprises wheels for mobility and a reel 130 for spooling the hose 101.

In one embodiment, the system 100 comprises a monitor 150 for viewing images from the camera. In one embodiment, high-resolution video from the camera with footage superimposed is displayed on a 5.6- or 8-inch TFT monitor and outputted via BNC connector, with options for digital recording (up to 32 GB) and Wi-Fi streaming.

In one embodiment, the system 100 comprises a control box 160 comprising, for example, batteries, control functionality, and video drivers as is known in the art. Still other embodiments of the system 100 will be known to those of skill in the art in light of this disclosure.

Referring to FIG. 2, various uses of the system of the present invention are described. FIG. 2 depicts an illustration of the different types of obstacles and challenges facing an ordinary pipe inspection. For example, the pipe 201 comprises a number of bends 203, and a number of lateral pipes in 202. Also characteristic of such pipes is debris 204 narrowing the pipe or a block 205 blocking the pipe. The system 100 is effective at inspecting pipes 201 as well as other structures involving relatively narrow passageways that may branch or bend.

The system 100 combines powerful propulsion, positive steering and bidirectional jetting to view and clean laterals from any main line or clean-out. For example, the system 100 snakes past multiple bends (1); uses its second nozzle to remotely to steer through branches by rotating the hose (2); levitates over debris (3); clears obstructions using the third nozzle (4); and locates cross-bores (5) pipe failures and blockages, all while jetting lines clean.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

What is claimed is:
1. A system for imaging a pipe, said system comprising:
(a) a first nozzle having a plurality of jets configured such that expelling fluid from said first nozzle urges the nozzle in an axial direction without substantially biasing the first nozzle laterally;
(b) a second nozzle in fluid communication with said first nozzle, said second nozzle having one or more jets configured such that expelling fluid from said second nozzle biases the second nozzle laterally, wherein at least one of said first or second nozzles is configured for attachment to a hose for providing pressurized fluid, wherein said second nozzle is operatively connectable to said hose such that rotating said hose rotates said second nozzle; and (c) a camera attached proximately to said second nozzle.

2. The system of claim 1, wherein said first and second nozzles are discrete.

3. The system of claim 2, wherein said first nozzle is deposed between said hose and second nozzle.

4. The system of claim 3, wherein said first and second nozzles are separated.

5. The system of claim 4, wherein said first and second nozzles are connected by a flexible hose.

6. The system of claim 1, wherein said second nozzle and said camera are integrated.

7. The system of claim 1, further comprising a bulbous housing around said camera.

8. The system of claim 1, wherein said plurality of jets of said first nozzle are symmetrically disposed about the perimeter of said first nozzle, and wherein said one or more jets of said second nozzle are disposed asymmetrically about the perimeter of said second nozzle.

9. The system of claim 1, wherein said one or more jets is a single jet.

10. The system of claim 1, further comprising a third nozzle having jets configured to expel said pressurized fluid forward of said camera.

11. A system for imaging a pipe, said system comprising:

(a) a first hose for conveying pressurized fluid, said first hose having a distal end;

(b) a first nozzle attached to said distal end, said first nozzle configured with a plurality of jets symmetrically arranged around said first nozzle such that expelling fluid from said first nozzle urges the nozzle in an axial direction opposite of said distal end without substantially biasing the first nozzle laterally;

(c) a second hose attached to said first nozzle at a first end;

(d) a second nozzle attached to a second end of said second hose, said second nozzle configured with one or more jets asymmetrically arranged around said second nozzle such that expelling fluid from said second nozzle biases the second nozzle laterally, thereby allowing said system to be steered as it is propelled along a pipe by rotating the first hose; and (e) a camera attached proximately to said second nozzle.

12. The system of claim 11, further comprising a third nozzle having jets configured to expel said pressurized fluid forward of said camera.

13. The system of claim 11, further comprising a bulbous housing around said camera.

14. A method for imaging a pipe having one or more laterals extending laterally from said pipe using an inspection system comprising at least a first nozzle having a plurality of jets configured such that expelling fluid from said first nozzle urges the nozzle in an axial direction without substantially biasing the first nozzle laterally, a second nozzle having one or more jets configured such that expelling fluid from said second nozzle biases the second nozzle laterally, a camera attached proximately to said second nozzle, and a hose connected to at least one of said first or second nozzles; said method comprising:

(a) inserting said camera in said pipe;

(b) pressurizing said hose such that fluid is expelled from said first nozzle to propel said camera axially along said pipe;

(c) identifying a lateral, a bend or debris in said pipe;

(d) rotating said hose to rotate said second nozzle, thereby laterally biasing said second nozzle toward said lateral, into said bend or around said debris; and (e) imaging at least a portion of the interior of said pipe.

15. The method of claim 14, wherein said camera provides images in real time.

16. The method of claim 15, wherein said images are video images.

17. The method of claim 14, wherein the system further comprises a third nozzle having jets configured to expel said pressurized fluid forward of said camera, and further comprising: rotating said hose to direct the spray from said third nozzle.

18. The method of claim 17, further comprising: pulsing the spray of said third nozzle.

19. The method of claim 17, further comprising: rotating said hose to bias said second nozzle away from debris.

20. The method of claim 14, wherein, in step (d), said second nozzle is biased toward said lateral, further comprising:

pressurizing said hose to cause said camera to travel down said lateral;

withdrawing said hose to withdraw said camera from said lateral;

rotating said hose to bias said second nozzle away from said lateral;

pressurizing said hose to cause said camera to travel down said pipe past said lateral;

identifying a second lateral past said lateral;

rotating said hose to bias said second nozzle toward said second lateral; and pressurizing said hose to cause said camera to travel down said second lateral.

* * * * *